(No Model.)

F. C. ROJO.
AXLE BOX.

No. 435,124.  Patented Aug. 26, 1890.

WITNESSES:
Henry Graban
R. Saunders Scott

INVENTOR
Frank C. Rojo

UNITED STATES PATENT OFFICE.

FRANK C. ROJO, OF NEW ORLEANS, LOUISIANA.

AXLE-BOX.

SPECIFICATION forming part of Letters Patent No. 435,124, dated August 26, 1890.

Application filed August 2, 1889. Serial No. 319,540. (No model.)

*To all whom it may concern:*

Be it known that I, FRANK C. ROJO, a citizen of the United States, residing at New Orleans, in the parish of Orleans and State of Louisiana, have invented a new and useful Improvement in Railroad-Car Axle-Boxes, of which the following is a specification.

My invention relates to that class of car-axles in which the journal of the axle revolves in a chamber containing the lubricant and a suitable vehicle—such as cotton or other medium—for feeding the lubricant to the journal; and the objects of my improvements are, first, to provide simple and effective means for excluding dust and grit from the interior of the box, thereby preserving the oil or lubricant in a condition so that there will be but little wear of the journal or bearing, and, second, an opening to the chamber containing the lubricant that will admit of wear of the journal and bearing. I attain these objects by the mechanism illustrated in the accompanying drawings, in which—

Figure 1:
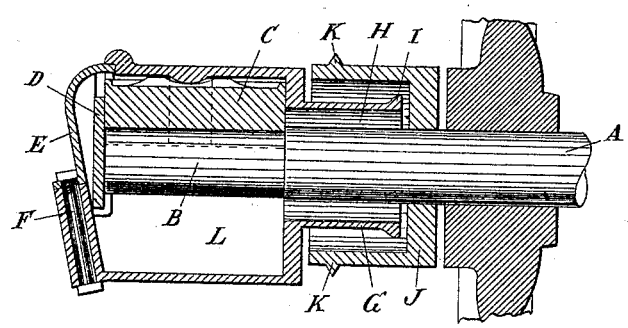
Figure 2:
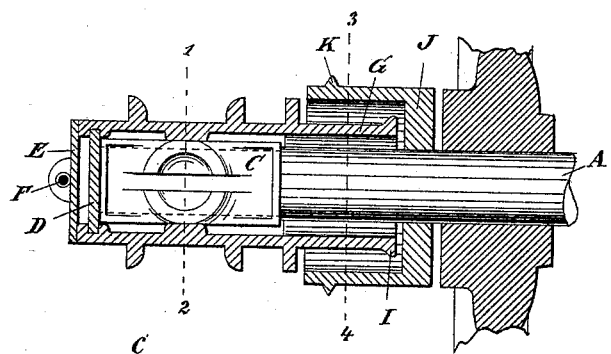
Figure 3:
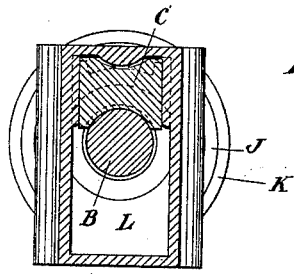
Figure 4:
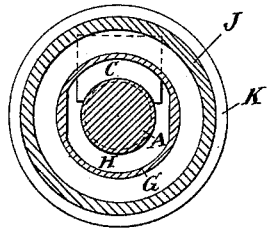

Figure 1 is a longitudinal sectional view of all the parts; Fig. 2, a top sectional view of the same; Fig. 3, a vertical section on the line 1 2, Fig. 2; and Fig. 4, a vertical section on the line 3 4, Fig. 2.

Similar letters refer to similar parts throughout the several views.

A is the axle; B, the axle-journal; C, the journal-bearing; D, a plate to receive the thrust of axle A; E, a lid or cover to the oil-chamber, which is held in place by bolt F; G, a hub formed on the rear wall of the oil-chamber, the inner side of which hub (marked H) is oblong to admit of wear of axle and journal-bearing; I, an enlarged part of hub G; J, a cup-shaped flange shrunk on the axle, which incloses hub G, thereby preventing access of dirt and grit to the axle-journal; K, a V-shaped bead formed on flange J to prevent dust or dirt from entering between the outer edge of flange J and the wall of the oil-chamber; L, the oil-chamber.

What I claim as my invention, and desire to secure by Letters Patent, is—

In a car-axle box, the combination of the axle A, the plate D, and the oil-chamber having a hub formed on its rear portion, with the cup-shaped flange J, provided with a V-shaped bead, said flange being shrunk on the axle and arranged to receive said hub, and the V-shaped bead adapted to exclude dust or dirt from between the outer edge of the flange J and the wall of the oil-chamber, substantially as shown and described.

FRANK C. ROJO.

Witnesses:
HENRY GRABAU,
R. SAUNDERS SCOTT.